United States Patent [19]

Schaphorst

[11] 4,387,395
[45] Jun. 7, 1983

[54] FACSIMILE TO VIDEO CONVERTER

[75] Inventor: Richard Schaphorst, Jenkintown, Pa.

[73] Assignee: Satellite Business Systems, McLean, Va.

[21] Appl. No.: 252,104

[22] Filed: Apr. 8, 1981

[51] Int. Cl.³ .............................................. H04N 5/02
[52] U.S. Cl. .................................... 358/140; 358/256; 358/280
[58] Field of Search ......................... 358/140, 256, 280

[56] References Cited

U.S. PATENT DOCUMENTS

| 3,832,487 | 8/1974 | De Niet | 358/140 |
|---|---|---|---|
| 4,032,977 | 6/1977 | Liao | 358/280 |
| 4,040,088 | 8/1977 | Hannan | 358/127 |
| 4,053,878 | 10/1977 | Cannon | 358/133 |
| 4,196,447 | 4/1980 | Dalke | 358/256 |
| 4,212,008 | 7/1980 | Hopkins | 340/723 |
| 4,280,144 | 7/1981 | Bacon | 358/280 |

FOREIGN PATENT DOCUMENTS 1280152  7/1972  United Kingdom .
1594346  7/1981  United Kingdom .

*Primary Examiner*—Benedict V. Safourek
*Assistant Examiner*—Edward L. Coles
*Attorney, Agent, or Firm*—Pollock, Vande Sande & Priddy

[57] ABSTRACT

A facsimile to video converter responds to a high bit rate binary signal and produces a single digital (or analog) signal which represents a plurality of pixels for driving a raster scanned display to thereby generate a visual image represented by the binary signals even though the display has resolution too low to directly accept the binary signals.

5 Claims, 5 Drawing Figures

FACSIMILE TO VIDEO CONVERTER

FIELD OF THE INVENTION

The invention relates to graphic signal processing, and more particularly to the processing of digital signals representing an image derived from a first device producing signals having a first set of characteristics, for display on a second device which device is incapable of accurately representing signals having the first set of characteristics.

BACKGROUND OF THE INVENTION

The availability of devices for converting visual images into digital signals, and correspondingly converting digital signals into visual images has enabled the transmission of information, corresponding to a visual image, from one point to another over an appropriate communication link. There are a variety of devices which are capable of converting visual images into digital signals and/or converting digital signals into visual images; not all of these devices have identical characteristics; and it is usually difficult to display on a device having a first set of characteristics an image represented by digital signals derived from a device having different characteristic. For example, one class of devices for converting visual images into digital signals are facsimile devices which scan an image in two dimensions and generate digital signals representing the "blackness" or "whiteness" of the image being scanned at several sample points. A different device for displaying visual images from information represented by digital signals comprises a cathode ray tube with a fluorescent screen which is scanned by an electron stream of intensity controlled by the signal amplitude; those skilled in the art will recognize the conventional TV system in this description. In order to appropriately display the visual image, the electron beam, whose amplitude is controlled in accordance with the digital signals representing the image, is caused to scan across the screen in a raster fashion and conventional devices typically scan 525 lines vertically, and each horizontal scan typically consumes $63.4 \times 10^{-6}$ seconds. The TV system is quite capable of displaying images represented by binary signals; however, since the system is capable of representing intensities intermediate "black" or "white" some of the capabilities of the system are not fully utilized if it is driven by binary signals.

On the other hand, digital facsimile devices are typically capable of generating only binary signals (that is, with one of two different amplitudes), but on the other hand, quite normally have resolution far in excess of the 525 lines of the TV system. For example, it is quite common to scan at a resolution of 2 to 3 hundred (up to a thousand) lines per inch; thus, for an entire document it is not uncommon to have signals distributed on 2 to 3 thousand (up to 10,000) lines for a document or image 10 inches long. Quite obviously, the signals generated by the facsimile device are, without some processing, incompatible with the TV system.

Several attempts have been made in the prior art to remedy this incapability, see for example, Hopkins U.S. Pat. No. 4,212,008; Hannan U.S. Pat. No. 4,040,088 and Cannon U.S. Pat. No. 4,053,878.

The Hannan and Cannon patents describe devices for increasing the apparent resolution of a TV monitor or standard TV set which devices are code driven; that is, each character to be displayed is represented by a code, for example, an eight bit ASCII code; and for that reason are not suitable for operating with binary signals representing the scanning of a visual image. Hopkins, on the other hand, does describe a device which responds to a two-level quantized video signal, i.e., a binary signal, each element of which corresponds to a pixel of the visual image which was scanned to produce the signal. In Hopkins the increased effective resolution is at least partly obtained by translating the binary signal into at least a three level signal which is used to control the intensity of a ray beam for producing a visual image having at least three different intensity levels. Of these, the third level or overshoot is an attempt to give the impression of higher resolution via edge sharpening. However, the device disclosed by Hopkins is incapable of solving the problem to which applicant has directed himself.

In contrast, the invention provides a device which is capable of accepting a binary high resolution signal, transforming that signal, while preserving sufficient of the information therein, so that the transformed or processed signal can drive a conventional TV monitor, a TV set or any monitor having resolution less than the input signal and display a reasonably accurate image of the originally scanned image. Accordingly, and in accordance with the invention, a display device for displaying an image in response to a high resolution binary input signal representing scanning of an image in y columns of x rows each, wherein $xy = A$, on a display device although said display device comprises a transducer incapable of displaying a visual image consisting of said binary input signals, comprises:

first means responsive to said binary input signals for selecting plural sub-sets of said binary input signals, each sub-set including at least three binary input signals selected so that two different pairings of two of said at least three signals represent orthogonal scanning, and, logic means responsive to binary signals of each sub-set for producing a translated signal for each sub-set with a characteristic numerically related to an arithmetic sum of binary signals of said sub-set, and means coupling said translated signal to said transducer to produce a visual image comprised of an ordered array of picture elements each corresponding to a different one of said translated signals.

In accordance with the invention, the input is a binary signal representing the scanning of a document carrying a visual image, obtained for example, by scanning the document with y columns of x rows each, thus the input contains a total of xy binary input signals wherein the amplitude of each input signal represents the scanned image or more precisely, each binary input signal corresponds to or has been mapped from a unique area of the document, and the amplitude of the signal is determined by the quantity of light reflected by the document at that particular location.

To display a signal with a transducer (for example, a TV set or a TV monitor capable of translating electrical energy contained in the binary signals, to optical energy given off by the screen) whose resolution is inadequate to separately display each of the binary input signals, requires a device to process or translate the binary input signals. That device includes for example, the first means which selects subsets of the binary input signals, each subset including at least three binary input signals, selected so that two different pairings of two of said at least three signals represent scanning in orthogonal directions. Each binary input signal can be correlated with a unique location on the original document, and if $x_i, y_j$ represents the input signal, where i and j represent respectively the particular row and column which generated the binary input signal, then each subset, as selected by the first means, include a plurality of binary input signals, some of which were generated from different rows of the same column, and others of which were generated from different columns of the same row, thus representing scanning in orthogonal directions.

The output of the first means is provided to a logic means which examines the binary input signals selected by the first means and produces, as an output, a translated signal with a characteristic selected as a result of the particular binary input signals in the sub-set. For example, a characteristic of the translated signal could be its amplitude, and typically, the amplitude is selected so that it could represent the average, over the sub-set of the amplitude of the binary signals in the subset, and thus is related to the arithmetic sum of the binary input signals. Depending upon the number of allowed states in the characteristic of the translated signal, the relation may be exact or only approximate. What is important, is that several binary input signals are represented by a single translated signal; that the correlation between input and output represents a decrease or compression of the signals representing the visual image, and that compression is effective in both dimensions of the document.

For display purposes, the translated signal is coupled to a display transducer such as a CRT which when properly scanned will reproduce the original visual image or a close approximation thereto notwithstanding the fact that the original image was defined with a binary input signal whose resolution far exceeded the capabilities of the transducer. Implementation of the invention is conceptualized by visualizing the binary input signals representing the document to be laid out on a matrix geographically similar to the document. The first means then examines this large matrix and selects a plurality of smaller matrices each made up of plural binary input signals. Each of these smaller matrices or sub-sets is made up of adjacent binary input signals in the overall matrix; the smaller matrices may or may not be unique in that a particular binary input signal may be contained in only a single one of the plural matrices; this obviously produces maximum compression; however, that is not essential to the invention and the smaller matrices may overlap to a smaller or greater extent.

In a simplest embodiment, each of the smaller matrices may comprise a two by two array with each of the binary input signals in only a single one of the smaller matrices. The logic means then sums or averages the binary input signals for each of the smaller matrices and produces as a result, the single translated signal for each of the smaller matrices which has a characteristic which is numerically related to the arithmetic sum of the binary input signals such as for example, the amplitude of the translated signal may be selected as the average of the binary input signals. Accordingly, the translated signal can be used to represent each of the binary input signals in the related matrix.

In a first embodiment of the invention the binary input signals are input to a series-parallel arrangement of delay circuits, each delaying its input by a selected multiple (from 1 to n, where n may be, for example, the number of columns employed in scanning). Accordingly, simultaneous selected outputs of the delay circuit combination represent different binary input signals of the same sub-set. The plural outputs of the delay arrangement is connected to a logic means which responds to its input signals and performs the processing to produce the translated signal with the characteristic, for example, amplitude which is numerically related to the arithmetic sum of the binary signals which are selected by delay circuit combination. In an embodiment described hereinafter, in order to ensure that a binary input signal is contained in only a single one of the sub-sets (to obtain maximum compression) a clocking circuit gates the logic means so that it operates only at selected bit times.

Those skilled in the art will readily appreciate that other implementations of the invention are equally feasible. For example, the set of binary input signals could be stored in a buffer (for example, RAM) with an a/b buffering arrangement to handle consecutive pages. An addressing scheme is then used to read out simultaneously from the buffer in time sequential fashion binary signals representing different sub-sets. The outputs of the buffer are coupled to a logic means or arithmetic circuit similar to the one described above for the purpose of generating the characteristic of the translated signal. As thus far described, the device arranges for the processing or translation of a stream of binary input signals at a particular bit rate. In the preferred embodiment the translated signals are digital although capable of more than two amplitude levels. For example, if each of the sub-sets is two by two, four binary input signals can have a sum of anywhere from zero to four and thus, a two bit signal (one of four amplitudes) can be used as an approximation to the average, or a three bit signal (capable of achieving eight different amplitude levels) can be used to exactly represent the average.

In order to display an image, the transducer's intensity is modulated with the characteristic of the translated signal, and appropriate horizontal and vertical deflection circuits are controlled so that the translated signal is properly located geographically in the screen so as to reproduce the desired image. If necessary, the digital output of the logic means can be D/A converted.

BRIEF DESCRIPTION OF THE DRAWINGS

In the following portion of the specification the invention will be more particularly described so as to enable those skilled in the art to make and use the same in connection with the attached drawings in which.

DETAILED DESCRIPTION OF THE DRAWINGS

Before describing the apparatus of the invention, the signals on which it operates, their temporal sequence and their relationship to a visual image will be described.

Figure 1A:
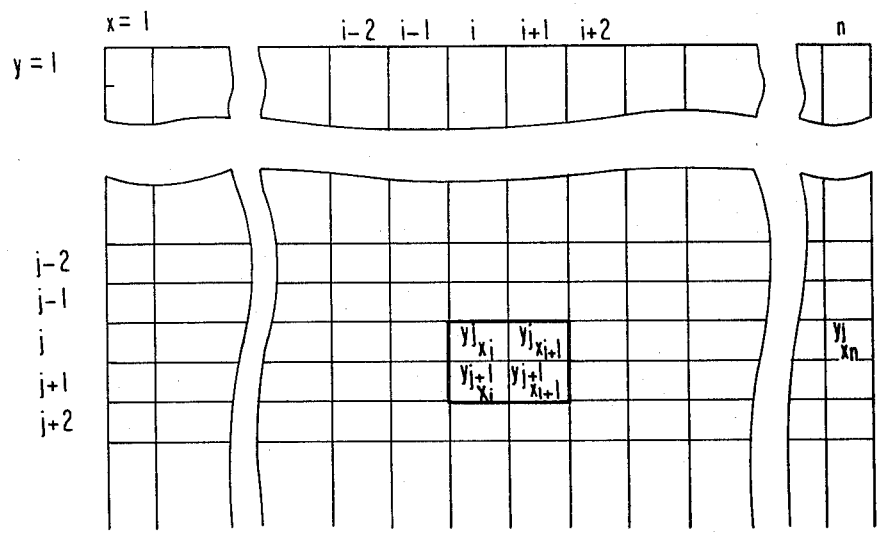
FIG. 1A represents a document scanned in two directions identifying the mapping of a plurality of pels to the document.
Figure 1B:
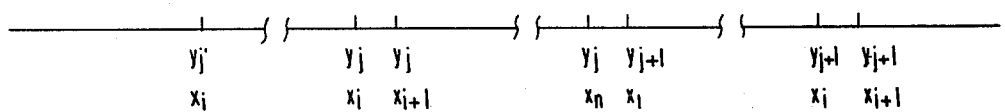
FIG. 1B represents a time sequence of fax pels.

FIG. 1A represents a document which is scanned by a conventional facsimile device. Such a device typically scans in rows and columns. For purposes of the discussion a grid has been overlaid on FIG. 1A. As shown the scanning is in a raster pattern and each binary input signal represents a unique area defined in the grid shown in FIG. 1A. Thus, for example a particular binary input signal may represent location $y_j$, $x_i$; as the scanning continues the row being scanned terminates with the binary input signal $y_j,x_n$, and the immediately following binary input signal corresponds to the location $y_{j+1},x_1$ and the immediately following binary input signal representing $y_{j+1},x_2$ FIG. 1B illustrates a temporal sequence of the binary input signals showing for example, that $y_j,x_i$ is immediately adjacent to the succeeding input signal $y_j,x_{i+1}$. In order to meet the object of the invention, a translated signal must be produced representing a matrix of the binary input signals; reference to FIG. 1A illustrates that adjacent locations enclosed in the heavy line correspond to binary input signals which are time displaced, see FIG. 1B.

Figure 2:
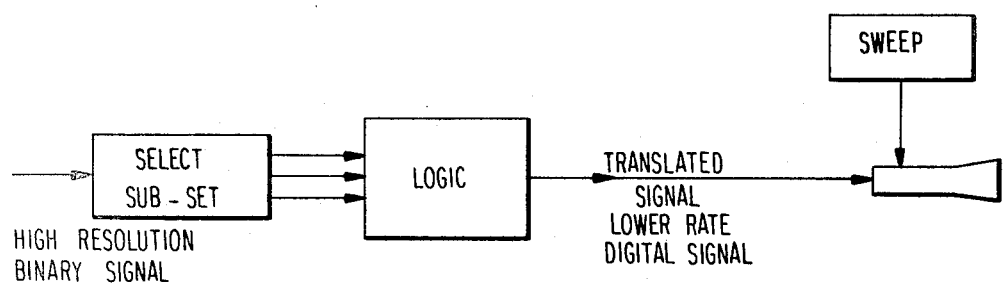
FIG. 2 is a block diagram of the invention.

FIG. 2 is a block diagram of the invention. As shown, the high resolution stream of binary input signals an input to a select sub-set circuit. This passes on selected sub-sets of the input signal to a logic circuit which produces the translated signals, each corresponding to a different sub-set of the input signals. A serial train of the translated signal is used to intensity modulate a raster swept CRT to provide an ordered array of picture elements, each corresponding to a different one of the translated signals.

Accordingly, the first means (or select sub-set circuit) of the invention must be arranged to select the desired binary input signals.

Figure 1C:
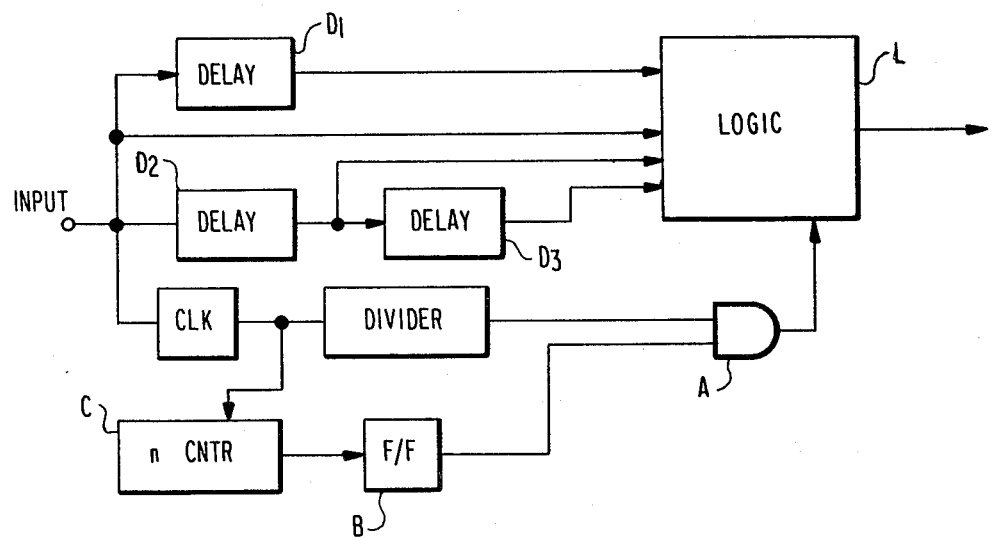
FIG. 1C is a detailed block diagram of one embodiment of the invention.

FIG. 1C is the functional block diagram of the apparatus of the invention. As shown, a plurality of delays, D1 through D3 delay the signal presented at their input. The binary input signal is input to delays D1 and D2, and the output of delay D2 is the input to delay D3. The output of each of the delays D1 through D3 provides one input to the logic circuit L and the binary input itself is the fourth input to the logic circuit L. By appropriately selecting the amount of delay introduced by each of the delays D1 through D3, appropriate signal selection is effected. Refer for a moment, to FIG. 1A and consider a time at which the binary input signal, available at the input terminal corresponds to $x_{j+1}, x_{i+1}$. If we arrange the delay D1 to delay its input by one bit time, then at the same time, the output of the delay D1 is the signal $y_{j+1},x_i$; and the logic circuit L has presented to it two of the desired input signals. In order to achieve a third of the four input signals we arrange delay D2 to provide delay equivalent to the number of bit times occupied by the total number of columns, that is n bit times (this will be referred to as a line); accordingly, delay D2 introduces a line delay. Thus, at the instant under discussion, the output of delay D2 is a signal corresponding to $y_j, x_{i+1}$. Finally if we arrange D3 to introduce a one bit time delay, then the output of D3, at the same instant under discussion, is $y_j,x_i$. In this fashion, delays D1–D3 select from the stream of binary input signals, the particular sub-set of binary input signals desired.

A further requirement which may be imposed, and would be in the event a two by two matrix is employed, is the requirement to ensure that each binary input signal occupies or is included in only a single sub-set. This is effected by the remainder of the circuitry shown in FIG. 1C. In particular, a clock recovery circuit (CLK) responds to the binary input signal train and produces an output, a clocking signal, as is well known to those skilled in the art. One input this is provided is a divider (for example, a divide by two circuit) and is also coupled as an input to an n stage counter C. The counter C will produce an output after n counts and change the condition of the bistable circuit B. Accordingly, for every other line of scanning, the bistable circuit B has a distinctive output, and during that time the divider changes state at half the rate of the clocking signal. The outputs of the divider and the bistable circuit B are coupled to an AND gate A and the output of the AND gate A is used to gate the logic circuit L. With this arrangement, the logic circuit L "looks" at its input signals only once for every four binary input signals.

The particular arrangement of the gating circuits for the logic circuit L are obviously dictated by the size of the sub-set which is employed to generate the translated signal as well as by whether or not each binary input signal is in only one sub-set. From this description those skilled in the art will be able to modify the functional diagram of FIG. 1C based on different requirements.

For example, it may be desirable to decrease the sampling or gating rate such that some of the input pels are "thrown away", that is, some of the input signals do not contribute to any logic circuit outputs.

It should also be apparent that while FIG. 1C shows a plurality of delay circuits, there are other ways to implement the invention, such as the A/B buffering arrangement mentioned above wherein an entire frame representing binary input signals for a complete document is input to a random access memory, and an addressing circuit used to sequentially select selected sub-sets for a logic circuit.

The logic circuit L itself may merely comprises an adder for summing the input signals. On the other hand, it can rearrange its input signals to form an appropriate output where, for example, the output resolution is inadequate to handle the exact sum. Consider a 2 by 2 sub-set. The logic circuit then has to generate five different outputs, for this three bits are sufficient. However, it may be desirable to weight the output of the logic circuit by multiplying by four, for example, so the five different outputs span 0–15 requiring with simple encoding, five bits.

This requirement can be relaxed to four bits if the highest output is represented as fifteen thus requiring only four bits. In such case it may also be desirable to represent the next highest output as 11 rather than 12.

Figure 3:
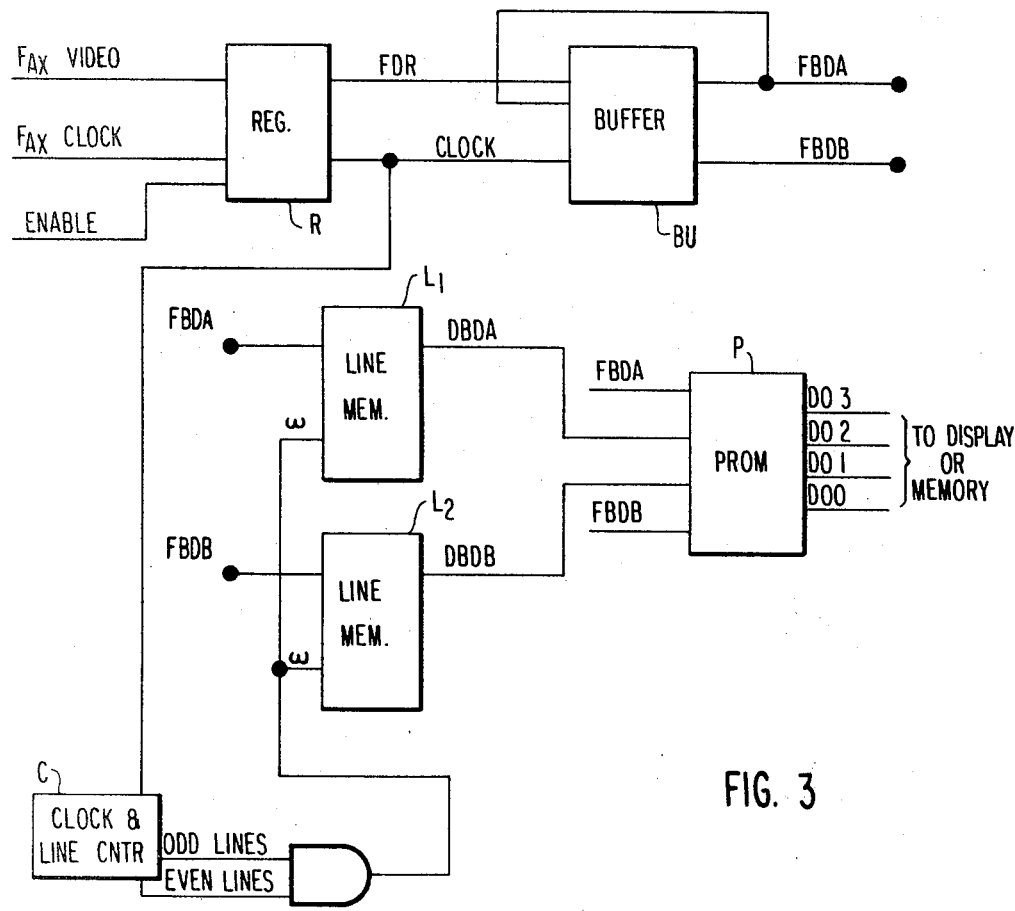
FIG. 3 is a detailed block diagram of another embodiment of the invention.

In another embodiment of the invention a one megabit facsimile input consisting of 2200 lines (per image) each line with 1720 binary pels is converted to a 1024×1024 digital raster by reducing the facsimile resolution by approximately 2:1 in both horizontal and vertical directions. At the same time, however, the number of bits per pixel is increased so as to compensate for the reduction in resolution. Refer now to FIG. 3, a register R has an input coupled to the signal FAX VIDEO (a one megabit facsimile signal). The register is clocked with a corresponding clock signal and gated with the signal ENABLE when valid data is present. The register buffers the input and provides an output FDR and a clock signal to a buffer BU. While the register R is needed only for timing purposes, the buffer BU provides a one pel delay, as follows. The buffer BU includes a first output FBDA, one pel delayed from its input FDR. The output FBDA is coupled back and provides a second input to the buffer BU, with a corresponding output, one pel time delayed represented as FBDB. Thus, at any instant of time the outputs FDBA and FBDB represent adjacent pels and buffer BU has thus provided a one pel delay. The signals FBDA and FBDB are coupled respectively to line memories L1 and L2, each line memory is capable of storing an entire scan line of 1728 pels and thus each line memory provides for a one line delay between its input and its output DBDA and DBDB, respectively. Thus, at any instant of time the set of signals FDBA, FBDB, DBDA and DBDB correspond to the appropriately delayed signals provided by the output of the delay circuit in FIG. 1C. In this embodiment of the invention the logic circuit L is implemented as a programmable read only memory P. This PROM is subjected to the four input signals and provides, at its output a corresponding four bit parallel output D00–D03. Those skilled in the art will understand how the programmable read only memory P can be programmed in order to provide an appropriate output combination D00–D03 for any input combination. For example, in one embodiment the PROM P provides all zeros to the output for all zeros on the input, a one bit on D00 output for any input combination in which only one signal is active, a single output on D01 for any input combination which includes two active signals, an output on D00 and D01 for any input combination which includes three active signals and a single output on D02, for any input combination in which all signals are active. In an embodiment of the invention which has actually been implemented, however, the outputs are weighted by multiplying by four, except that the highest and second highest outputs correspond to 15 (rather than 16) and 11 (rather than 12). This is implemented by providing, an all zero output for all zero inputs, an output on D02 for any input combination including only a single active signal, an output on D03 only for any input combination in which two signals are active, an output signal on D03, D01 and D00 for any input signal combination in which three signals are active, and outputs on all of D03, D02, D01 and D00 for the input signal combination in which all four signals are active.

In order to provide the reduction in resolution, the facsimile video clock is provided as an input to the clocking circuit and line counter C. The clocking circuit includes a number of dividers that in effect count even and odd pels as well as even and odd lines. By selecting only one of even or odd pels and only one of even or odd lines, to generate a gating signal to enable the line memories L1 and L2 to write, the desired gating function is achieved. Of course, whether even or odd lines is selected or even or odd pels is immaterial.

It should be apparent from the foregoing that the invention could be extended beyond using 2×2 arrays by appropriate changes to the PROM P, buffer BU and increasing the number of line memories in the set of line memories L1 and L2, along with corresponding changes to the clock and the gating signal generator.

What is claimed is:

1. A display device for displaying an image in response to a sequence of high resolution binary input signals representing scanning of an image in y columns of x rows each wherein xy=A although said display device comprises a transducer incapable of displaying a visual image consisting of said binary input signals, comprising:

first means responsive to said binary input signals for selecting plural sub-sets of said binary input signals, each sub-set including at least three binary input signals, selected so that two different pairings of two of said at least three signals represent orthogonal scanning, logic means responsive to binary signals of each sub-set for producing a multi-bit translated signal for each sub-set with a characteristic numerically related to an arithmetic sum of binary signals of said sub-set, and means coupling said translated signal to said transducer to produce a visual image comprised of an ordered array of picture elements each corresponding to a different one of said translated signals.

2. The apparatus of claim 1 wherein said first means comprises a plurality of means for delaying said input signals by different delays so as to simultaneously generate an output representing a complete sub-set.

3. The apparatus of claims 1 or 2 which further includes gating means coupled to said first means, to ensure that any binary signal is in one and only one sub-set.

4. The apparatus of claim 1 wherein each said sub-set is a regular 2×2 array of directly adjacent binary signals.

5. The apparatus of claim 1 or 2 in which said logic means comprises an adder.

* * * * *